(No Model.)

J. H. KLIPSTEIN.
TIRE FOR WHEELS.

No. 406,742. Patented July 9, 1889.

Witnesses
Henry J. Dieterich,
H. F. Riley

Inventor
James H. Klipstein
By his Attorneys

UNITED STATES PATENT OFFICE.

JAMES HIXSON KLIPSTEIN, OF BUCHANAN, VIRGINIA.

TIRE FOR WHEELS.

SPECIFICATION forming part of Letters Patent No. 406,742, dated July 9, 1889.

Application filed April 13, 1889. Serial No. 307,102. (No model.)

*To all whom it may concern:*

Be it known that I, JAMES HIXSON KLIPSTEIN, a citizen of the United States, residing at Buchanan, in the county of Botetourt and State of Virginia, have invented a new and useful Improvement in Wheels of Bicycles, of which the following is a specification.

The invention relates to improvements in the wheels of vehicles, pertaining more particularly to the wheels of bicycles and tricycles; and it consists in the construction and novel combination of parts, hereinafter described, illustrated in the accompanying drawings, and pointed out in the appended claims.

Figure 1:
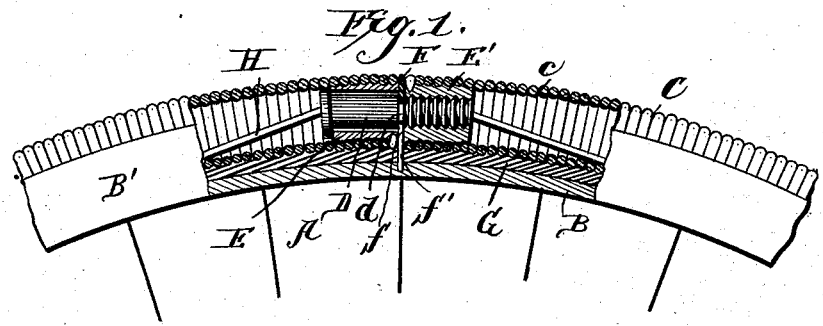
Figure 2:
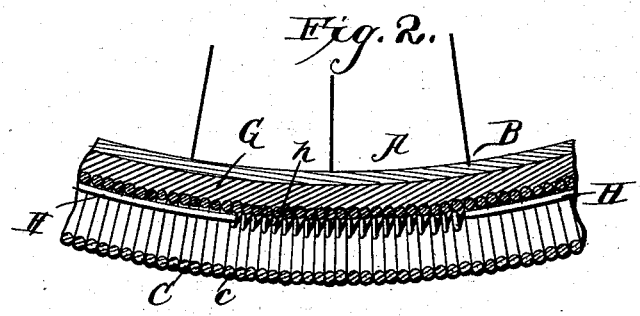
Figure 3:
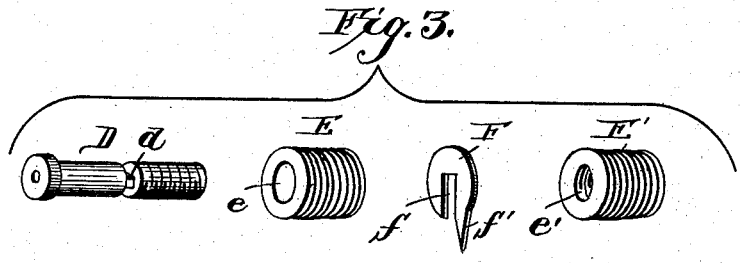
Figure 4:

Figure 1 of the drawings is a side elevation of a tire, partly in section to show the manner of securing the ends together. Fig. 2 is a detail sectional view. Fig. 3 is a detail perspective view of the swiveled bar, the nuts, and the key. Fig. 4 is a detail of the wrench.

Referring to the drawings by letter, A designates a portion of the wheel of a vehicle—such as a bicycle. The tread or felly B of the said wheel is concave transversely and holds a spring-tire, in place of the rubber tire usually employed.

C is the tire, made of elastic wire or band-steel or other metal wrapped closely in coils and fitting in the groove or concavity of the tread. Though the said tire may be of any elastic metal wire—angular, round, or flat—it is preferably of steel tempered to a point at which the metal is both tough and elastic. The coils c of the wire are equal in size and are nearly in contact, so that they mutually sustain each other, and the ends thereof are connected by a hollow bolt D, which is swiveled in a nut E and adapted to engage another nut E'. The nuts E and E' have their circumferences threaded and are screwed into the ends of the tire C, and are retained thereon by bending the ends of the wire in upon their faces or inserting in suitable depressions, and they are provided with central openings e and e', the latter one being threaded to receive the bolt D, that is swiveled in the opening e. The bolt D is reduced at d to provide a hold for a wrench, by which the ends of the tire are drawn closely together. In order to prevent the bolt from accidentally turning, a key F is employed, which is about the same diameter as the tire and is provided with a slot f, the sides of which conform to the configuration of the reduced portion d of the bolt D, and the said key has a projection f', which is formed on the periphery of the key F, near the mouth of the slot f, and is designed to engage in a recess in the tread or felly B.

A corrugated rubber spring-band G is preferably interposed between the tire and rim and forms a cushion for the tire. The rim may be shouldered at B' on its edges to hold the spring in place.

A cord, wire, spiral spring, or rubber cord H could, if desired, be stretched within the tire to aid in holding it. The tire should be slightly smaller than the rim, so that it will bind thereon, and it may be either flat or angular in cross-section. When the cord H is employed, it is run through the tire, bolts, and nuts before the latter are secured into the tire, and it is provided intermediate of its ends with a spiral spring h, whereby it may be stretched tightly enough around the felly to hold the tire thereto in case of breakage of the latter.

Having described my invention, I claim—

1. In a vehicle-wheel, a tire of continuous coiled wire or band-steel surrounding the rim of the wheel, substantially as specified.

2. A vehicle-tire of continuous elastic coiled steel wire or band-steel, substantially as specified.

3. The combination, with a tire of continuous coiled wire or band-steel, of the nuts secured in the ends of the tire and the bolt swiveled to one of said nuts and adapted to engage the other, substantially as described.

4. The combination, with a tire, of the nuts secured in the ends thereof, the bolt swiveled to one of said nuts and adapted to engage the other and provided with a reduced portion d, and a key having a slot conforming to a configuration of the sides of the reduced portion and provided with a projection to engage a recess in a felly, substantially as described.

5. The combination of the tire of continuous coiled wire or band-steel having its ends suitably secured together and an elastic cord passing through said end around the felly, substantially as described.

In testimony that I claim the foregoing as my own I have hereto affixed my signature in presence of two witnesses.

JAMES HIXSON KLIPSTEIN.

Witnesses:
J. J. ZIMMERMAN,
D. D. BOOZE.